United States Patent
Sakase et al.

(10) Patent No.: US 10,228,021 B2
(45) Date of Patent: Mar. 12, 2019

(54) MACHINED CAGE FOR THRUST BALL BEARING, DESIGN METHOD OF THE SAME, AND THRUST BALL BEARING INCLUDING THE CAGE

(71) Applicant: NSK LTD., Tokyo (JP)

(72) Inventors: Tomoaki Sakase, Fujisawa (JP); Takanori Kurokawa, Fujisawa (JP)

(73) Assignee: NSK LTD., Tokyo (JP)

( * ) Notice: Subject to any disclaimer, the term of this patent is extended or adjusted under 35 U.S.C. 154(b) by 46 days.

(21) Appl. No.: 15/126,800

(22) PCT Filed: Mar. 16, 2015

(86) PCT No.: PCT/JP2015/057762
§ 371 (c)(1),
(2) Date: Sep. 16, 2016

(87) PCT Pub. No.: WO2015/141642
PCT Pub. Date: Sep. 24, 2015

(65) Prior Publication Data
US 2017/0089392 A1 Mar. 30, 2017

(30) Foreign Application Priority Data
Mar. 17, 2014 (JP) .................. 2014-053726

(51) Int. Cl.
*F16C 27/00* (2006.01)
*F16C 33/38* (2006.01)
(Continued)

(52) U.S. Cl.
CPC .......... *F16C 33/3887* (2013.01); *F16C 19/10* (2013.01); *F16C 33/38* (2013.01);
(Continued)

(58) Field of Classification Search
CPC .................................. F16C 33/3887
(Continued)

(56) References Cited

U.S. PATENT DOCUMENTS 6,368,245 B1 4/2002 Goto et al.
8,864,386 B2 * 10/2014 Ghilbert-Simon .... F16C 19/163
384/523

(Continued)

FOREIGN PATENT DOCUMENTS

CN 1456822 A 11/2003
CN 2674184 Y 1/2005
(Continued)

OTHER PUBLICATIONS

Machine Translation of CN 102817918.*
(Continued)

*Primary Examiner* — Thomas R Hannon
(74) *Attorney, Agent, or Firm* — Sughrue Mion, PLLC (57) ABSTRACT

In a copper alloy machined cage for a thrust ball bearing, an inside surface of a pocket includes a cylindrical surface, a support surface which is continuous with the cylindrical surface and contacts a ball in an axial direction, and two protruding portions which are formed at an equal interval in a circumferential direction of the pocket, at a ball insertion side of the pocket which is opposite to the support surface in the axial direction and protrude from the cylindrical surface. The protruding portions prevent falling out of the ball from a ball insertion side opening of the pocket and are either elastically deformed or elastic-plastically deformed by the ball during insertion of the ball into the pocket.

5 Claims, 6 Drawing Sheets

(51) Int. Cl.
*F16C 19/10* (2006.01)
*F16C 43/08* (2006.01)
*F16C 43/06* (2006.01)

(52) U.S. Cl.
CPC ........ *F16C 33/385* (2013.01); *F16C 33/3843* (2013.01); *F16C 43/06* (2013.01); *F16C 43/083* (2013.01); *F16C 2204/10* (2013.01)

(58) Field of Classification Search
USPC ....................................................... 384/614
See application file for complete search history.

(56) References Cited

U.S. PATENT DOCUMENTS

| | | | |
|---|---|---|---|
| 2002/0151407 | A1 | 10/2002 | Yoshikawa |
| 2004/0028306 | A1 | 2/2004 | Kern et al. |
| 2007/0071383 | A1* | 3/2007 | Kawamura ............. F16C 19/10 384/614 |
| 2013/0114921 | A1* | 5/2013 | Miyamoto ............. F16O 33/44 384/614 |
| 2015/0252846 | A1* | 9/2015 | Sakamoto ........... F16O 33/3887 384/614 |

FOREIGN PATENT DOCUMENTS

| | | |
|---|---|---|
| CN | 2828424 Y | 10/2006 |
| CN | 102817918 A | 12/2012 |
| DE | 266093 C | 3/1912 |
| JP | 2000002245 A | 1/2000 |
| JP | 2001-004003 A | 1/2001 |
| JP | 2002-213561 A | 7/2002 |
| JP | 2004-084868 A | 3/2004 |
| JP | 2006-077964 A | 3/2006 |
| JP | 2006-307900 A | 11/2006 |
| JP | 2008-002652 A | 1/2008 |
| JP | 2008-223970 A | 9/2008 |

OTHER PUBLICATIONS

Machine Translation of JP2008223970.*
Machine Translation of JP2006307900.*
Search Report dated Jun. 9, 2015, issued by the International Searching Authority in counterpart International Application No. PCT/JP2015/057762 (PCT/ISA/210).
Written Opinion dated Jun. 9, 2015, issued by the International Searching Authority in counterpart International Application No. PCT/JP2015/057762 (PCT/ISA/237).
Communication dated Nov. 17, 2017, issued by The State Intellectual Property Office of the People's Republic of China in counterpart Chinese application No. 201580014532.3.
Communication dated Jan. 14, 2019 from the German Patent and Trademark Office in counterpart application No. 11 2015 001 278.8.

* cited by examiner

MACHINED CAGE FOR THRUST BALL BEARING, DESIGN METHOD OF THE SAME, AND THRUST BALL BEARING INCLUDING THE CAGE

TECHNICAL FIELD

The present invention relates to a machined cage for a thrust ball bearing, a design method of the same, and a thrust ball bearing including the cage.

BACKGROUND ART

Since a thrust ball bearing is configured such that a shaft washer and a housing washer are separable from each other, it is necessary to ensure that balls do not easily fall out from the cage in view of ease of handling such as attachment and detachment of the bearing to and from a device.

Figure 7A:
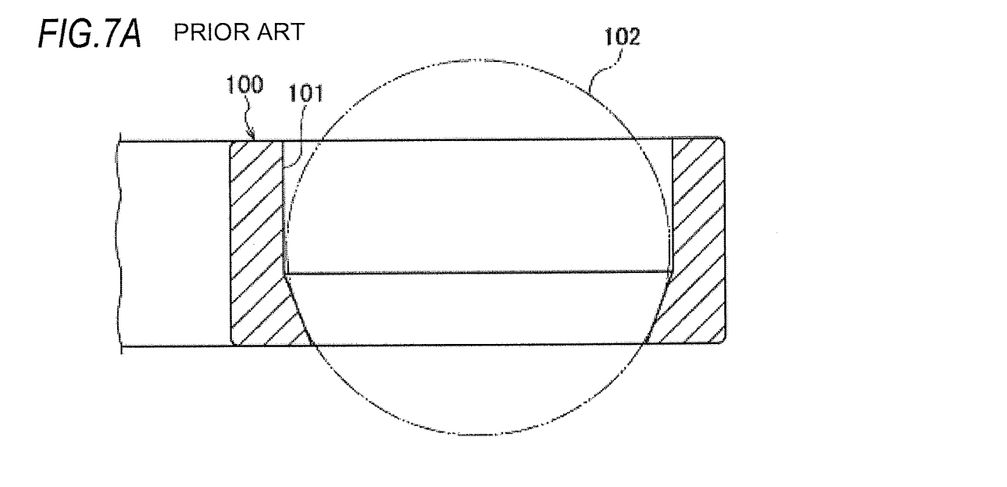
FIG. 7A is a cross-sectional view of a conventional copper alloy machined cage for a thrust ball bearing.
Figure 7B:
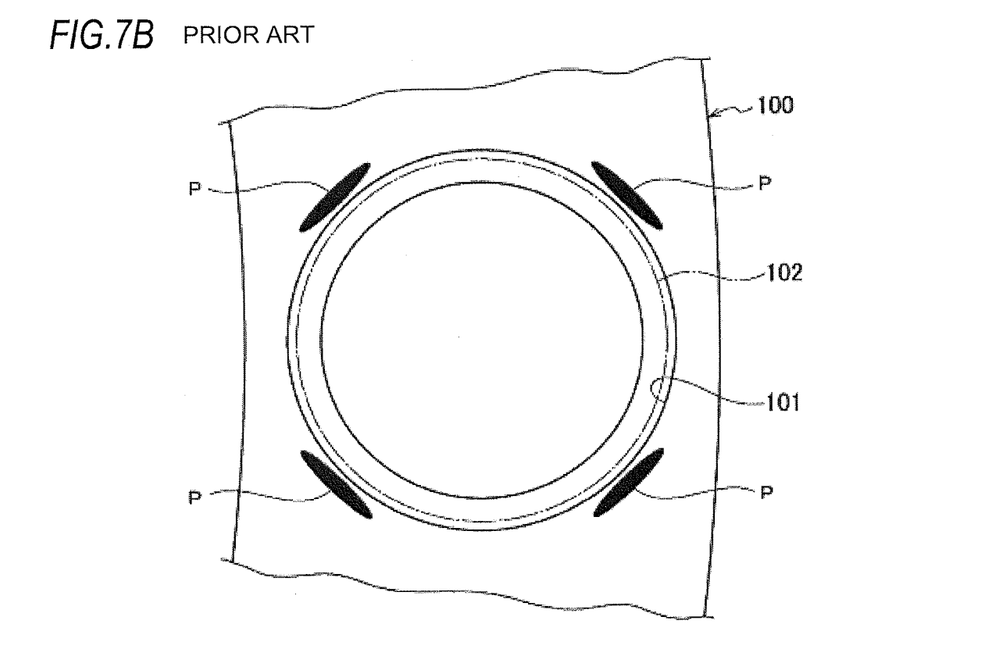
FIG. 7B is an enlarged upper surface view of a main portion thereof.

A copper alloy machined cage is known as a cage used in a thrust ball bearing. As shown in FIG. 7, a conventional copper alloy machined cage 100 has a shape in which one side of a pocket 101 holds a ball 102 in a truncated cone shape, and the other side thereof is cylindrical. Since it is easy for the ball 102 to fall out in this state when the ball 102 is placed into the pocket 101 from the cylindrical side, the periphery of the pocket 101 is swaged at four positions P after placing the ball 102 in the case 100 to prevent the ball 102 from falling out.

Further, there has been proposed a resin cage in which an entrance diameter of a cage pocket is set to be smaller than a ball diameter, and in which ball is placed through elastic deformation (for example, refer to Patent Document 1 and Patent Document 2).

BACKGROUND ART DOCUMENT

Problems to be Solved

Patent Document 1: JP-A-2006-77964
Patent Document 2: JP-A-2008-2652

SUMMARY OF THE INVENTION

Problems to be Solved

Incidentally, in a thrust ball bearing which has an outer diameter exceeding approximately 300 mm, a resin cage is not suitable in view of the molding and strength, and a steel plate pressed cage is also inferior to a copper alloy machined cage in terms of restrictions in size, rotating accuracy, high-speed properties, and the like. In addition, in a case where a production volume is low, it is desirable to adopt a copper alloy machined cage in view of cost.

On the other hand, in the copper alloy machined cage 100 which is shown in FIG. 7, a process of swaging is performed using a press machine or manual operation with a hammer or the like when the size is large. Therefore, there are various problems such as large work load and time, poor productivity, non-uniformity of a swaging amount, deterioration of the accuracy of the pocket shape, and defects in external appearance.

Patent Documents 1 and 2 cover resin cages but do not consider copper alloy machined cages.

The present invention has been made in view of the above-mentioned problems, and an object of the present invention is to provide a machined cage for a thrust ball bearing in which insertion of a ball into a pocket is easier and the ball is difficult to be fallen out from the pocket without losing functions of a copper alloy machined cage, a design method thereof, and a thrust ball bearing including the cage.

Means for Solving the Problems

The object of the present invention can be achieved by the following configuration.
(1) A copper alloy machined cage for a thrust ball bearing, the machined cage comprising a plurality of pockets which are configured to rollably hold balls and arranged in a circumferential direction,
wherein an inner surface of a pocket includes a cylindrical surface, and a support surface which is continuous with the cylindrical surface and is configured to contact a ball in an axial direction,
wherein the cylindrical surface is formed with two protruding portions at an equal interval in a circumferential direction of the pocket, the two protruding portions protruding from the cylindrical surface at a ball insertion side of the pocket which is opposite to the support surface in the axial direction, and
wherein the protruding portions are configured to prevent falling out of the ball from a ball insertion side opening of the pocket and are either elastically deformable or elastic-plastically deformable by the ball during insertion of the ball into the pocket.
(2) The machined cage for a thrust ball bearing according to (1), wherein the two protruding portions are provided on an inner diameter side and an outer diameter side of the cage, respectively.
(3) The machined cage for a thrust ball bearing according to (1) or (2), wherein the plurality of pockets are formed such that ball insertion side openings of the pockets alternately face one side in the axial direction of the cage and the other side in the axial direction, and if a distance from an axial end surface of a support surface side of the cage to a height of the ball protruding from the ball insertion side opening of the pocket when the ball contacts the support surface is denoted as S, a diameter of the ball is denoted as Da, and an inner diameter of a virtual circle which is formed by circular arc surfaces of the protruding portions is denoted as X, an axial length Z of the protruding portions extending from a ball insertion side end surface of the cage satisfies the Expression (1).

[Expression 1]

$$Z < S - \frac{Da}{2} - \frac{\sqrt{Da^2 - X^2}}{2} \quad (1)$$

(4) The machined cage for a thrust ball bearing according to any one of (1) to (3), wherein if an inner diameter of a virtual circle which is formed by circular arc surfaces of the protruding portions is denoted as X, a diameter of the ball is denoted as Da, and a total interference amount of the two protruding portions with the ball in a radial direction is denoted as δ=Da−X, 0.001 Da<δ<0.015 Da is satisfied.
(5) The machined cage for a thrust ball bearing according to (4), wherein if a width of the protruding portions is denoted as Y, 0.15 Da<Y<0.70 Da is satisfied.
(6) A thrust ball bearing comprising the cage according to any one of claims 1 to 5.

(7) A design method of a machined cage for a thrust ball bearing, the machined cage including a plurality of pockets which are configured to rollably hold balls and arranged in a circumferential direction, wherein an inner surface of a pocket includes a cylindrical surface, and a support surface which is continuous with the cylindrical surface and is configured to contact a ball in an axial direction, wherein the cylindrical surface is formed with two protruding portions at an equal interval in a circumferential direction of the pocket, the two protruding portions protruding from the cylindrical surface at a ball insertion side of the pocket which is opposite to the support surface in the axial direction, wherein the protruding portions are configured to prevent falling out of the ball from a ball insertion side opening of the pocket and are either elastically deformable or elastic-plastically deformable by the ball during insertion of the ball into the pocket, and wherein at least one of an axial length Z, an inner diameter X and a width Y of the protruding portions is defined as a function of a diameter of the ball.

Effects of the Invention

According to the machined cage for a thrust ball bearing of the present invention, an inner surface of a pocket includes a cylindrical surface, and a support surface which is continuous with the cylindrical surface and is configured to contact a ball in an axial direction, and the cylindrical surface is formed with two protruding portions at an equal interval in a circumferential direction of the pocket, which protrude from the cylindrical surface at a ball insertion side of the pocket which is opposite to the support surface in the axial direction. Further, the protruding portions are configured to prevent falling out of the ball from a ball insertion side opening of the pocket and are either elastically deformable or elastic-plastically deformable by the ball during insertion of the ball into the pocket. Accordingly, insertion of a ball into a pocket becomes easier and the ball is difficult to be fallen out from the pocket without losing functions of a copper alloy machined cage.

DESCRIPTION OF EMBODIMENTS

Hereinafter, an embodiment of a machined cage for a thrust ball bearing according to the present invention and a thrust ball bearing including the machined cage for a thrust ball bearing will be described in detail while referring to the drawings.

Figure 1:
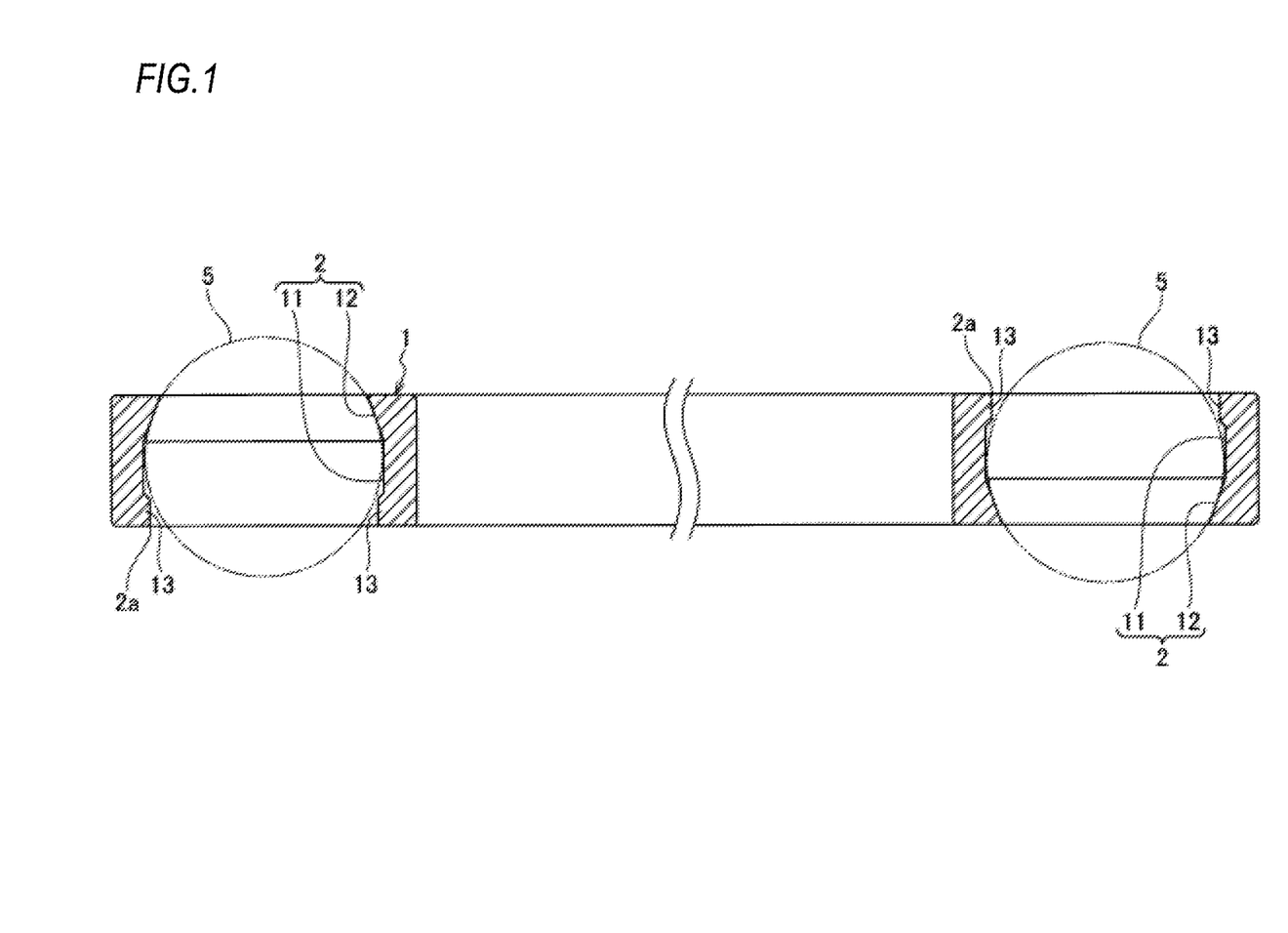
FIG. 1 is a cross-sectional view of a machined cage for a thrust ball bearing according to an embodiment of the present invention.
Figure 2:
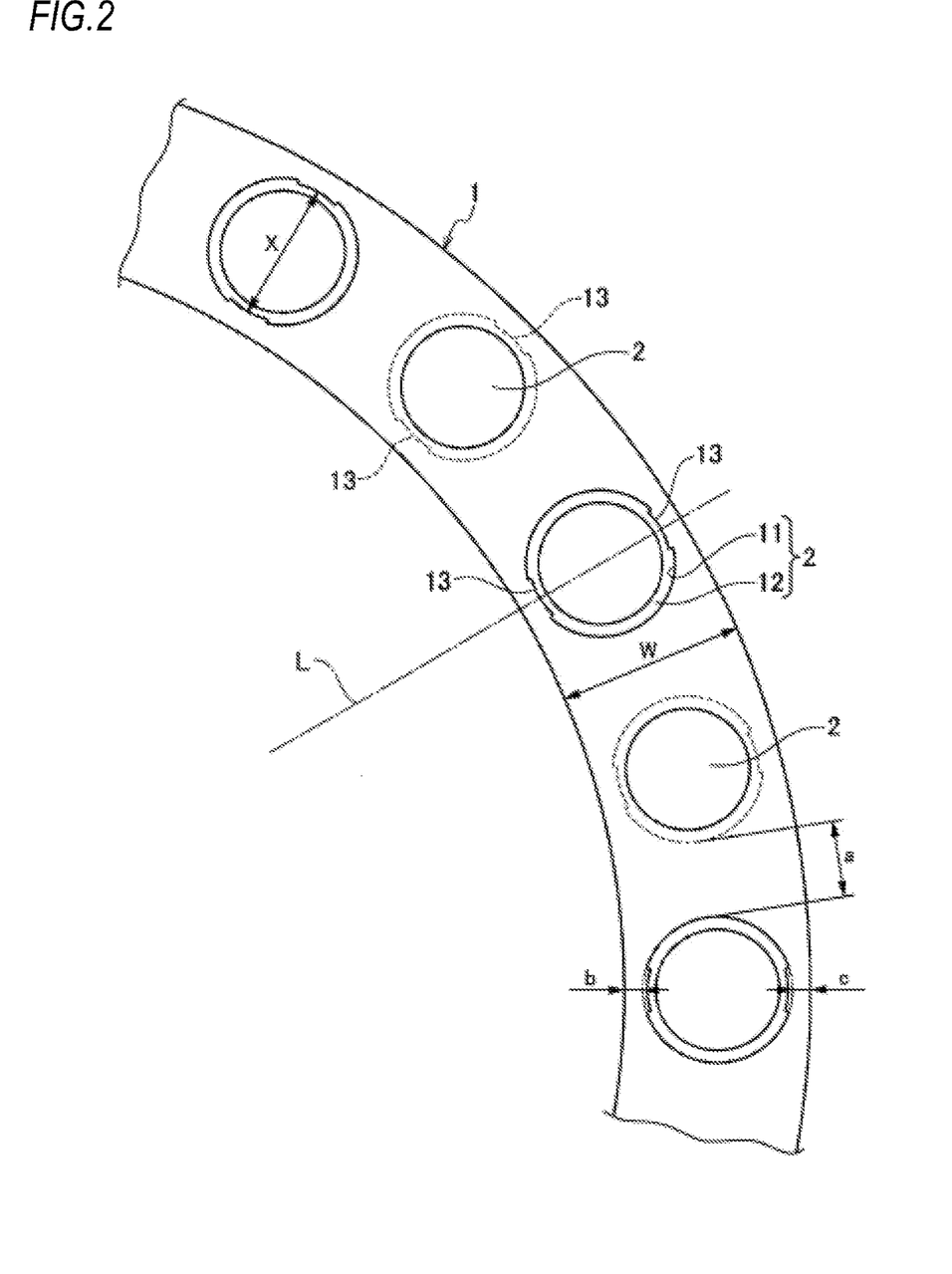
FIG. 2 is a partial plan view of the machined cage for a thrust ball bearing of FIG. 1.

As shown in FIGS. 1 and 2, a thrust ball bearing of the present embodiment includes a plurality of balls 5, and a copper alloy machined cage 1 which includes a plurality of pockets 2 which is configured to rollably hold the balls 5 and arranged at an equal interval in a circumferential direction. The plurality of balls 5 roll between a shaft washer and a housing washer, which are not illustrated in the drawings.

An inner surface of each pocket 2 of the machined cage 1 includes a cylindrical surface 11, and a truncated cone-shaped support surface 12 which is continuous with the cylindrical surface 11 and gradually and continuously decrease in a diameter and contacts the ball 5 in an axial direction. The inner surface of the pocket 2 is formed with protruding portions 13 at two positions on an inner diameter side and an outer diameter side of the cage 1, respectively. The protruding portions 13 protrude from the cylindrical surface 11 toward a center of the pocket 2 at a ball insertion side of the pocket 2 (closer to a ball insertion side opening of the cylindrical surface 11) which is opposite to the support surface 12 in the axial direction.

Figure 3A:
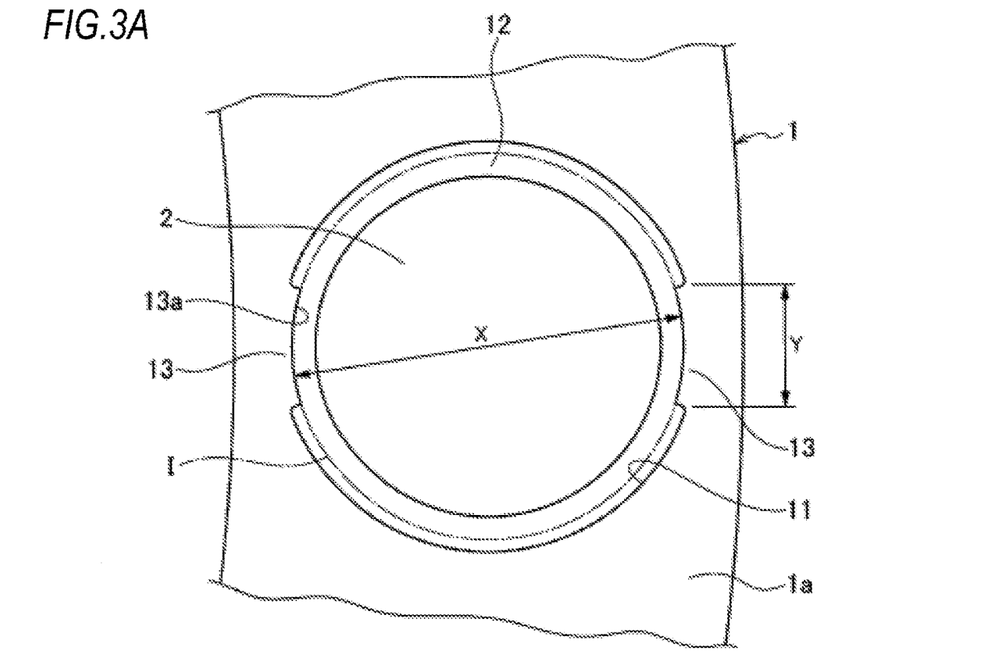
FIG. 3A is an enlarged sectional view of the machined cage for a thrust ball bearing.
Figure 3B:
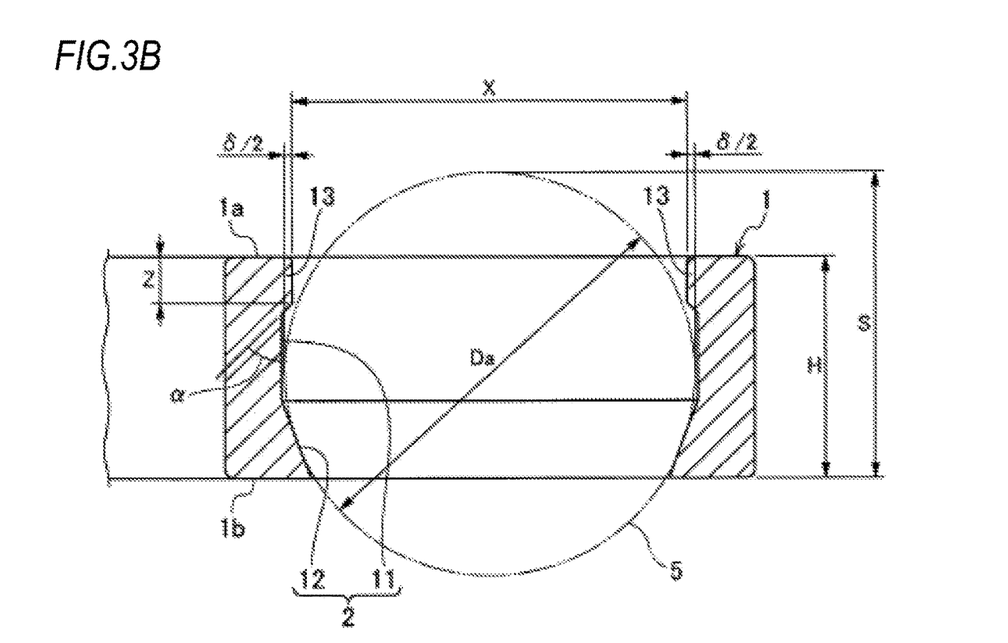
FIG. 3B is an enlarged plan view thereof.

As shown in FIG. 3, in the present embodiment, the protruding portions 13 have a circular arc surface 13a while protruding from the cylindrical surface 11 toward the center of the pocket 2 at a predetermined height and have a predetermined width Y in a direction which is orthogonal to a radial direction of the cage 1. The protruding portions 13 have a predetermined axial length Z from a ball insertion side end surface 1a of the cage 1, and a support surface side tip ends of the protruding portions 13 are inclined by an angle $\alpha$.

The protruding portions 13 prevent falling out of the ball 5 from an opening side of the pocket 2 and are configured to be elastic-plastically deformed (deformation having elastic deformation and plastic deformation) by the ball 5 during insertion of the ball 5 into the pocket 2. Accordingly, the ball 5 is inserted into the pocket 2 by elastic-plastically deforming the protruding portions 13 from the opening side of the pocket 2 while crushing the protruding portions 13.

As shown in FIG. 2, the plurality of pockets 2 are formed such that ball insertion side openings 2a of the pockets 2 alternately face one side in the axial direction of the cage 1 and the other side in the axial direction. Therefore, as shown in FIG. 1, the support surfaces 12 which are on the one side and the other side in the axial direction come into contact with the balls 5, and the machined cage 1 is configured to be not in contact with a shaft washer and a housing washer, which are not illustrated in the drawings.

Herein, the protruding portions 13 of the present embodiment are designed to be defined as a function of ball diameter Da as shown below.

(a) Inner Diameter X (Interference) of Protruding Portions 13

As shown in FIG. 3A, if the inner diameter of a virtual circle I which is formed by the circular arc surfaces 13a of the two protruding portions 13 is denoted as X, and the total interference amount of the two protruding portions 13 with the ball diameter Da in a radial direction is denoted as $\delta$ (=Da−X), the inner diameter X of the protruding portions 13 is defined such that $0.001\ Da < \delta < 0.015\ Da$ is satisfied.

Although it is preferable that the inner diameter X is designed such that the protruding portions 13 is within an elastic deformation region when the ball 5 is inserted into the pocket 2 of the cage 1, since this is difficult in terms of productivity while considering the tolerances of the ball 5, which is a steel ball, and the inner diameter X, δ is defined in the above-mentioned manner.

It is sufficient if the force which is required to remove the ball 5 from the pocket 2 (a removal force) is large enough for the inserted ball 5 not to slip out from the cage 1 easily, and in order for this, δ may be set to be larger. However, if the δ is set to be too large, the force which is required to insert the ball 5 in the pocket 2 (an insertion force) increases, so that the workability of ball insertion deteriorates and ball damage occurs, and the amount of plastic deformation increases, so that there is a concern of deterioration in the external appearance.

Figure 4:
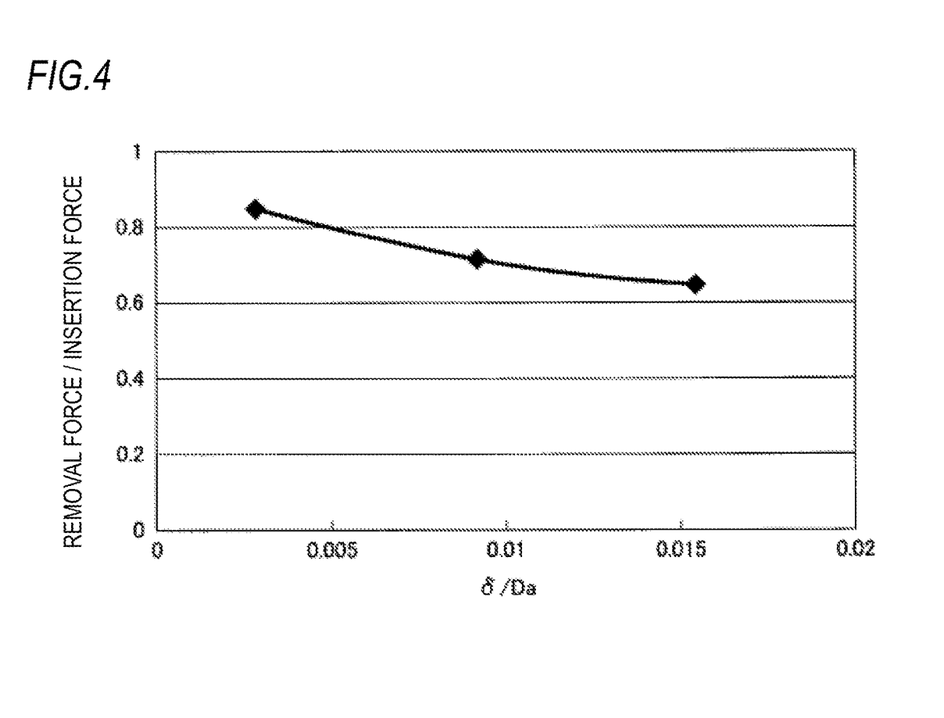
FIG. 4 is a graph which shows FEM analysis of a relationship between an inner diameter of a protruding portion and a load of ball insertion and ball removal of the cage.

FIG. 4 shows FEM analysis of the loads of ball insertion and ball removal for a thrust ball bearing cage with 19 balls, which has an inner diameter of 170 mm and an outer diameter of 215 mm. The horizontal axis shows a ratio of δ and the ball diameter Da, and the vertical axis shows a ratio of the removal force and the insertion force. In this analysis, the width Y of the protruding portions 13 is set as 0.15 Da<Y<0.70 Da, which is described below. Since the ratio of the insertion force and the removal force decreases as δ increases, the efficiency of increasing δ for the sake of the removal force is poor. The reduction in the ratio of the insertion force and the removal force is due to the amount of plastic deformation increasing as δ increases, and therefore, crushing of the protruding portions 13 increases, so that the external appearance deteriorates. Therefore, the upper limit of δ is defined as δ<0.015 Da.

Further, since the removal force is small and there is a high probability that the ball 5 fall out of the cage 1 during handling when δ is 0.001 Da or less, the lower limit of δ is defined as 0.001 Da<δ.

(b) Width Y of Protruding Portions 13

The width Y of the protruding portions 13 with respect to the ball diameter Da is defined such that 0.15 Da<Y<0.70 Da is satisfied, and preferably is defined such that 0.15 Da<Y<0.40 Da is satisfied.

Figure 5:
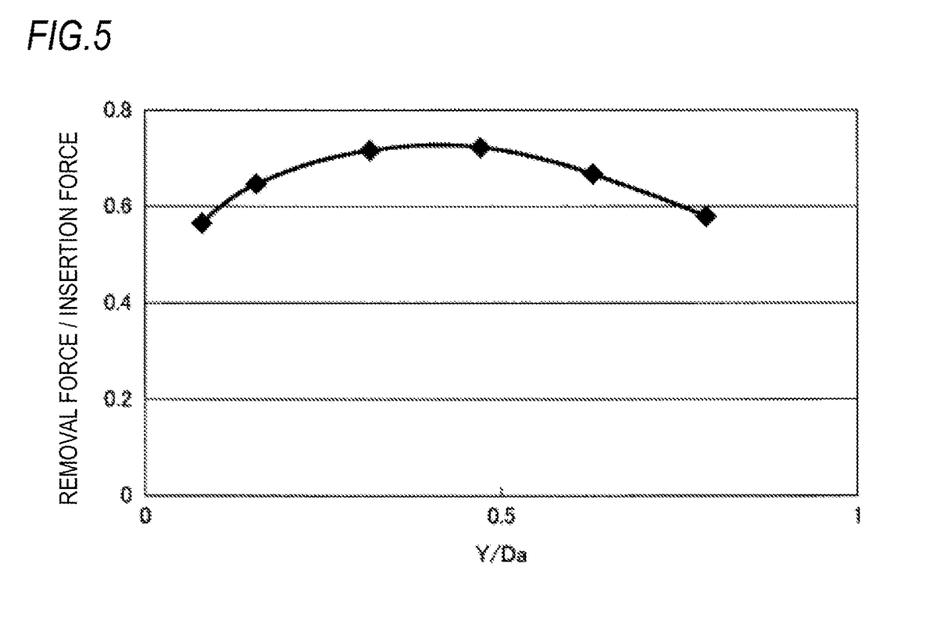
FIG. 5 is a graph which shows FEM analysis of a relationship between a width of a protruding portion and a load of ball insertion and ball removal of the cage.

FIG. 5 shows FEM analysis of the loads of ball insertion and ball removal of a cage for a thrust ball bearing with 19 balls, which has an inner diameter of 170 mm and an outer diameter of 215 mm. The horizontal axis shows a ratio of the width Y and the ball diameter Da, and the vertical axis shows a ratio of the removal force and the insertion force. In this analysis, the inner diameter X of the protruding portions 13 is set to a value which satisfies the above-mentioned range of δ. The ratio of the removal force and the insertion force is large when the width Y satisfies 0.15 Da<Y<0.70 Da. However, when the width Y is set to 0.4 Da or more, the insertion force itself increases, and therefore, insertion workability deteriorates. Therefore, it is preferable that the width Y be defined as 0.15 Da<Y<0.40 Da.

In the above designing of the inner diameter X and the width Y, FEM analysis is performed using a cage for a thrust ball bearing having an outer diameter of 215 mm, but the inner diameter X and the width Y which are given as a function of the ball diameter Da can be used if the thrust ball bearing has an outer diameter exceeding approximately 100 mm.

(c) Axial Length Z of Protruding Portions 13

As described above, the plurality of pockets 2 are formed such that the ball insertion side openings of the pockets 2 alternately face one side in the axial direction of the cage 1 and the other side in the axial direction, the support surfaces 12 which are on the one side and the other side in the axial direction come into contact with the balls 5, so that the machined cage 1 does not come into contact with the shaft washer and the housing washer. In order for the ball 5 to be held by the truncated cone-shaped support surface 12 and not come into contact with the protruding portions 13, the axial length Z of the protruding portions 13 which extend from the ball insertion side end surface 1a of the cage 1 is defined such that the following expression is satisfied.

That is, when a distance from an axial end surface 1b of a support surface side of the cage 1 to a height of the ball 5 protruding from the ball insertion side opening 2a of the pocket 2 when the ball 5 contacts the support surface 12 is denoted as S, a ball diameter is denoted as Da, and an inner diameter of a virtual circle I which is formed by the circular arc surfaces 13a of the protruding portions 13 is denoted as X, an axial length Z of the protruding portions 13 satisfies Expression (1). Incidentally, it is sufficient if a lower limit value of Z is 0<Z.

[Expression]

$$Z < S - \frac{Da}{2} - \frac{\sqrt{Da^2 - X^2}}{2} \qquad (1)$$

In the present embodiment, the two protruding portions 13 are provided on the outer diameter side and the inner diameter side of the cage 1. The insertion force and the removal force of the balls 5 are influenced by the wall thickness of portions in which the protruding portions 13 are provided, in addition to the shape of the protruding portions 13. As shown in FIG. 2, since a wall thickness a in the circumferential direction is determined based on the inner and outer diameters of the bearing, the ball diameter and the number of balls, the insertion force and the removal force are greatly influenced by the size of the bearing even in a cage which uses balls 5 having the same ball diameter. Meanwhile, the wall thicknesses b and c of the inner diameter side and the outer diameter side are determined based on the ball diameter Da and the inner and outer diameters of the cage 1. The inner and outer diameters of the cage 1 can be set arbitrarily with limitations on the strength and the size of the bearing, and the wall thickness W in a cage radial direction is set to satisfy 1.2 Da<W<1.5 Da in consideration of the limitations on the strength and the size of the bearing. Even if the sizes of the bearings differ due to the wall thicknesses being adjusted, it is possible to configure the same pocket shape as long as the wall thicknesses b and c are set to be the same and the ball diameter that is used is the same, and therefore, it is possible to standardize the tools for performing processing of the pockets 2, which leads cost reduction.

Therefore, in the present embodiment, the two protruding portions 13 are provided on the outer diameter side and the inner diameter side of the cage 1 while middle positions thereof in the circumferential directions is positioned on a line L which extends along the radial direction of the cage 1.

Further, the material costs can remain the same as those of a conventional cage by using the shape of the protruding portions 13 which do not protrude from the cage width. According to the machined cage 1 configured as described above, although the processing costs of the pockets 2 are increased as the pocket shapes are complex, it is possible to omit a swaging process of the pockets 2, which leads cost reduction.

As described above, according to the machined cage 1 for a thrust ball bearing of the present embodiment, the inner surface of the pocket 2 includes the cylindrical surface 11, and the support surface 12 which is continuous with the cylindrical surface 11 and contacts the ball 5 in the axial direction, and the cylindrical surface 11 is formed with two protruding portions 13 at an equal interval in a circumferential direction of the pocket 2, which protrude from the cylindrical surface 11 at a ball insertion side of the pocket 2 which is opposite to the support surface 12 in the axial direction. Further, the protruding portions 13 are configured to prevent falling out of the ball 5 from the ball insertion side opening of the pocket 2 and are elastic-plastically deformed by the ball 5 during insertion of the ball 5 into the pocket 2. Accordingly, insertion of the ball 5 into a pocket 2 becomes easier and the ball 5 is difficult to be fallen from the pocket 2 without losing functions of the copper alloy machined cage 1.

Further, according to the design method of the machined cage 1 for a thrust ball bearing of the present embodiment, since at least one of the axial length Z, the inner diameter X and the width Y of the protruding portions 13 is defined as a function of the ball diameter Da, it is possible to achieve an improvement in the insertion properties of the ball 5 into the pocket 2 irrelevant to the size of the bearing and prevention of falling out of the ball 5 from the pocket 2.

Meanwhile, the present invention is not limited to the above-described embodiment and modification examples, and modifications, improvements, and the like can be made.

Figure 6:
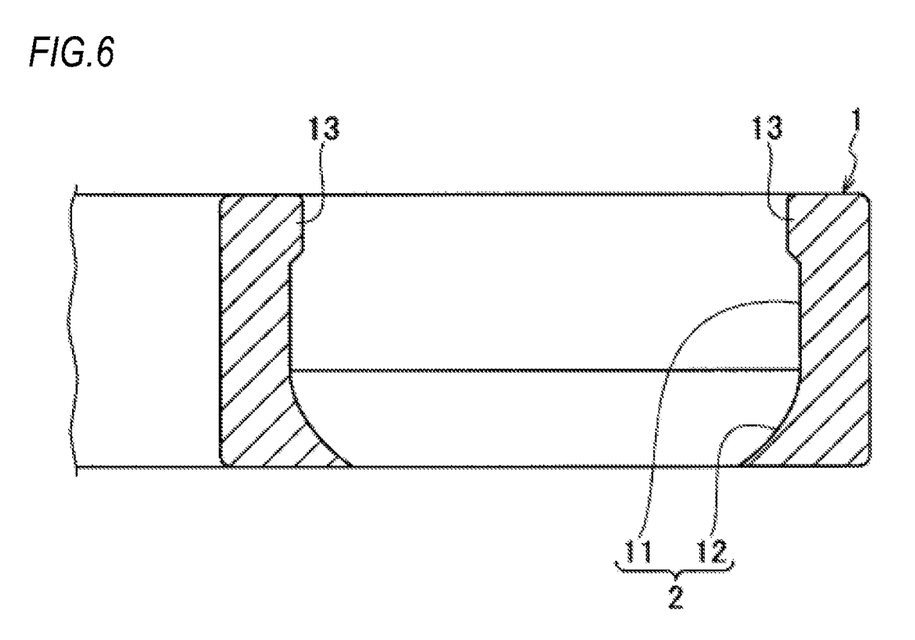
FIG. 6 is a cross-sectional view of a machined cage for a thrust ball bearing according to a modification example of the present invention.

In the above-described embodiment, the support surface 12 of the pocket 2 is formed in a truncated cone shape, but the present invention is not limited thereto. For example, the support surface 12 may be formed in a shape such as the mortar-shaped support surface 12 as shown in FIG. 6, as long as it comes into contact with the ball 5 in the axial direction and the ball 5 does not slip out from a side which is opposite to the opening side of the pocket 2.

Further, it is preferable that the two protruding portions are provided on the inner diameter side and the outer diameter side of the cage 1, respectively, but another arrangement may be used as long as the protruding portions are formed at an equal interval in the circumferential direction of the pocket 2.

Further, the machined cage for a thrust ball bearing of the present invention can be also applied to a single-type or a double-type thrust ball bearing.

Further, the protruding portions 13 are elastic-plastically deformed by the ball 5 when the ball 5 is inserted into the pocket 2, but if it is possible to design the tolerance of the ball 5 and the inner diameter X of protruding portions 13 to be smaller, a configuration where the ball 5 is inserted though elastic deformation may be used.

Further, the material of the balls 5 is not limited to a steel ball of the above-described embodiment, and for example, may also be a ceramic ball.

The present application is based on Japanese Patent Application No. 2014-53726 filed on Mar. 17, 2014, the contents of which are incorporated herein by reference.

DESCRIPTION OF REFERENCE NUMERALS

1: Machined cage for thrust ball bearing
2: Pocket
5: Ball
11: Cylindrical surface
12: Support surface
13: Protruding portion
X: Inner Diameter
Y: Width
Z: Axial length

The invention claimed is:

1. A copper alloy machined cage for a thrust ball bearing, the machined cage comprising a plurality of pockets which are configured to rollably hold balls and arranged in a circumferential direction, wherein an inner surface of a pocket includes a cylindrical surface, and a support surface which is continuous with the cylindrical surface and is configured to contact a ball in an axial direction, wherein the cylindrical surface is formed with two protruding portions at an equal interval in a circumferential direction of the pocket, the two protruding portions protruding from the cylindrical surface at a ball insertion side of the pocket which is opposite to the support surface in the axial direction, wherein the protruding portions are configured to prevent falling out of the ball from a ball insertion side opening of the pocket and are either elastically deformable or elastic-plastically deformable by the ball during insertion of the ball into the pocket, and wherein if an inner diameter of a virtual circle which is formed by circular arc surfaces of the protruding portions is denoted as X, a diameter of the ball is denoted as Da, and a total interference amount of the two protruding portions with the ball in a radial direction is denoted as $\delta = Da - X$, $0.001\, Da < \delta < 0.015\, Da$ is satisfied, wherein each of the protruding portions protrudes toward a center of the pockets by a predetermined amount to form a partial cylindrical circular arc surface, and the partial cylindrical circular arc surface extends from a ball insertion side end surface of the cage in an axial inward direction by a predetermined axial length.

2. The machined cage for a thrust ball bearing according to claim 1, wherein the two protruding portions are provided on an inner diameter side and an outer diameter side of the cage, respectively.

3. The machined cage for a thrust ball bearing according to claim 1, wherein the plurality of pockets are formed such that ball insertion side openings of the pockets alternately face one side in the axial direction of the cage and the other side in the axial direction, and wherein if a distance from an axial end surface of a support surface side of the cage to a height of the ball protruding from the ball insertion side opening of the pocket when the ball contacts the support surface is denoted as S, a diameter of the ball is denoted as Da, and an inner diameter of a virtual circle which is formed by the circular arc surfaces of the protruding portions is denoted as X, the axial length Z of the protruding portions extending from the ball insertion side end surface of the cage satisfies the Expression (1)

[Expression 1]

$$Z < S - \frac{Da}{2} - \frac{\sqrt{Da^2 - X^2}}{2}. \tag{1}$$

4. The machined cage for a thrust ball bearing according to claim 1,
wherein if a width of the protruding portions is denoted as Y, 0.15 Da<Y<0.70 Da is satisfied.

5. A thrust ball bearing comprising the cage according to claim 1.

* * * * *